No. 840,421. PATENTED JAN. 1, 1907.
G. W. BARNETT.
WHEEL PLOW.
APPLICATION FILED JAN. 3, 1906.

2 SHEETS—SHEET 1.

Witnesses
G. R. Thomas
F. C. Jones

Inventor
G. W. Barnett
By Chandler & Chandler
Attorneys

No. 840,421. PATENTED JAN. 1, 1907.
G. W. BARNETT.
WHEEL PLOW.
APPLICATION FILED JAN. 3, 1906.
2 SHEETS—SHEET 2.
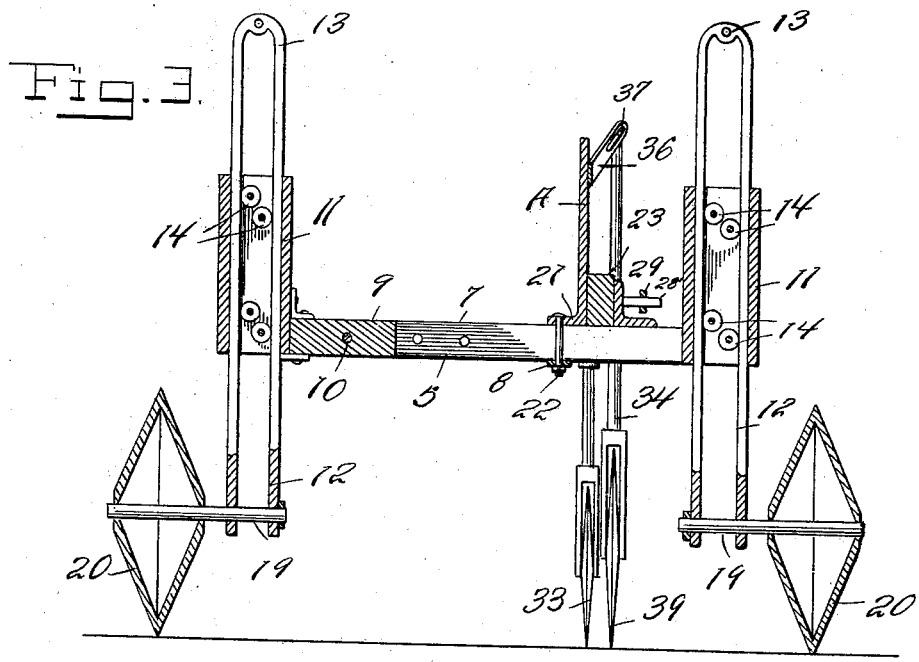
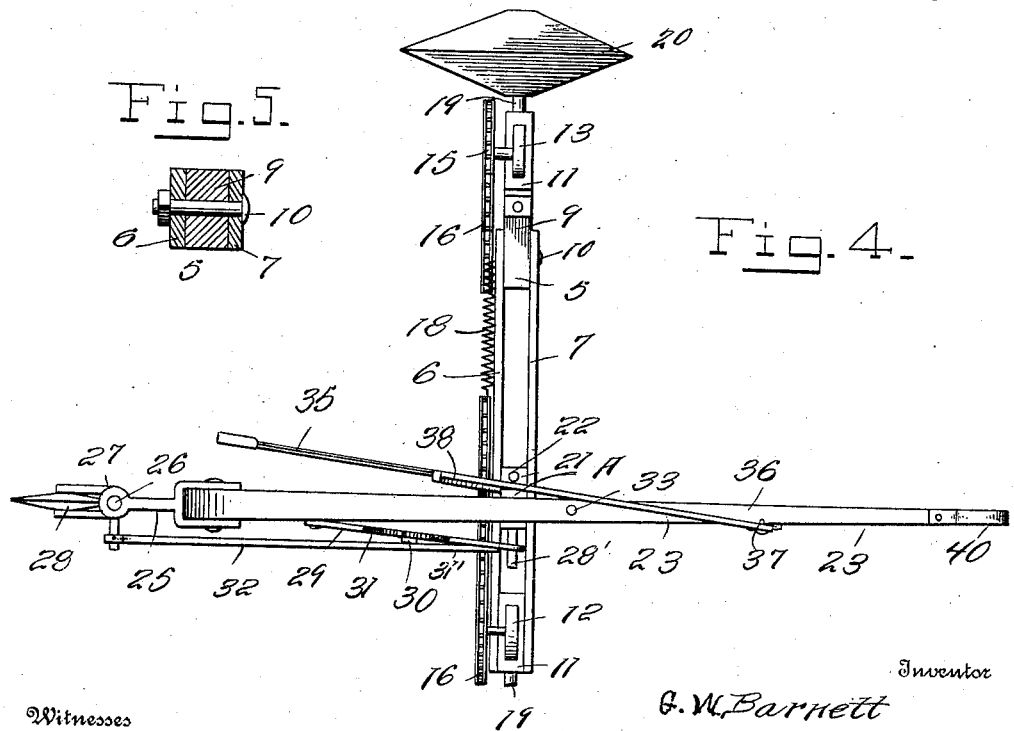
Witnesses
G. R. Thomas
J. C. Jones
Inventor
G. W. Barnett
By Chandler & Chandler
Attorneys

UNITED STATES PATENT OFFICE.

GEORGE W. BARNETT, OF LOUISE, TEXAS.

WHEEL-PLOW.

No. 840,421.  Specification of Letters Patent.  Patented Jan. 1, 1907.

Application filed January 3, 1906. Serial No. 294,389.

*To all whom it may concern:*

Be it known that I, GEORGE W. BARNETT, a citizen of the United States, residing at Louise, in the county of Wharton, State of Texas, have invented certain new and useful Improvements in Wheel-Plows; and I do hereby declare the following to be a full, clear, and exact description of the invention, such as will enable others skilled in the art to which it appertains to make and use the same.

This invention relates to plows, and more particularly to wheel-plows, and has for its object to provide an implement of this kind which will be arranged to permit of independent vertical movement of certain of its wheels to allow them to pass easily over obstructions.

Another object is to provide a plow so arranged that certain of its wheels may be shifted to vary the angle of the share and which will be provided with means for shifting the wheels.

Other objects and advantages will be apparent from the following description.

Figure 1:
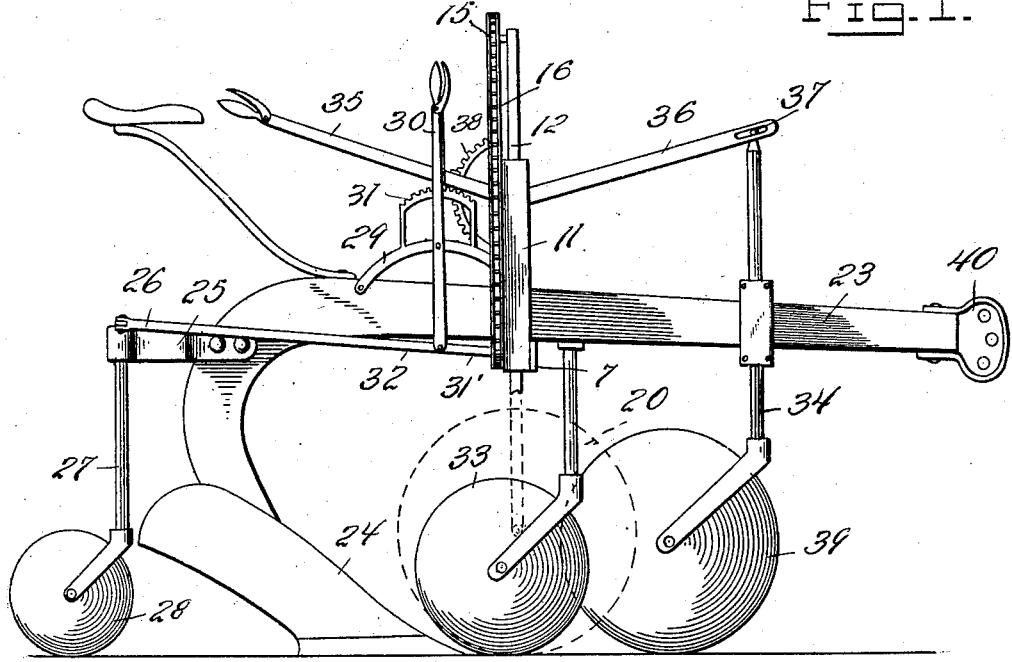
Figure 2:
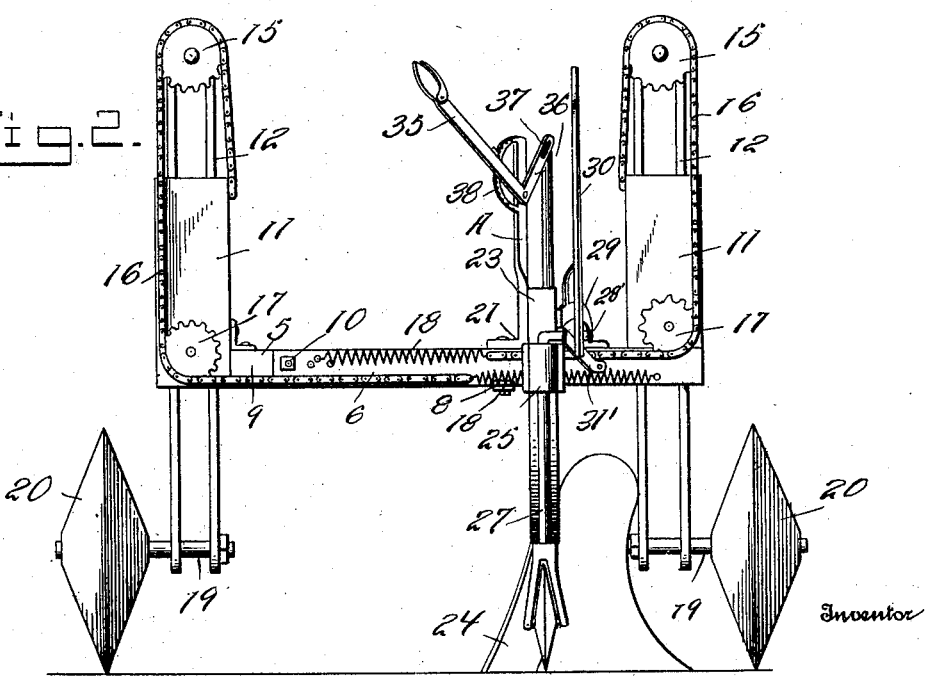

In the drawings forming a portion of this specification, and in which like characters of reference indicate similar parts in the several views, Figure 1 is a side elevation of the present plow. Fig. 2 is a rear elevation. Fig. 3 is a vertical transverse section taken longitudinally of the cross member. Fig. 4 is a top plan view. Fig. 5 is a cross-section of the cross member.

Referring now to the drawings, the present invention comprises a cross member 5, including plates 6 and 7. A beam 9 is engaged between the inner ends of the plates 6 and 7 for sliding movement longitudinally thereof, and means 10 is provided for holding the plates and beams at different points of their movement with respect to each other.

Vertical guides 11 are carried by the member 5 at its ends, one being secured between the plates 6 and 7 and the other to the beam 9, and received slidably within the guides are vertically-disposed U-shaped slides 12, the bights 13 of which are directed upwardly. Rollers 14 are disposed in the guides between the legs of the U-shaped slides and rest against the legs thereof, the slides being thus arranged for easy vertical movement. Vertically-extending sprocket-wheels 15 are pivotally mounted upon the bights 13, and sprocket-chains 16 are secured at one end to the guides 11 at the inner portions thereof, passing upwardly and over the sprockets 15 and then downwardly and under the sprockets 17, located adjacent to the lower ends of the guides, the chains passing inwardly from these last-named sprockets and being secured to helical springs 18, which are attached to the cross member 5. These springs thus hold the slides yieldably against upward movement.

Outwardly-projecting horizontal spindles 19 are carried by the lower ends of the slides, which extend beneath the member 5, and journaled upon these spindles are groundwheels 20, these wheels being arranged for independent vertical movement, as will be apparent from the foregoing.

Pivotally mounted upon the beam 5 for horizontal movement with respect thereto there is a casting 21, which is located adjacent to one end of the beam, this casting being held in position by a bolt 22, pivotally engaged therein and passed through a plate 8, located beneath the plates 6 and 7 and turned upwardly against the outer faces thereof.

A main plow-beam 23 is secured in the casting 21, thus extending transversely of the member 5 and longitudinally of the implement, the rearward end of this beam being turned downwardly and has secured thereto a share 24. A bracket 25 is secured to the rearward portion of the beam and has journaled therein a vertical member 27, having a rear wheel 28 connected with its lower end for rotation in a vertical plane. The member 27 carries a laterally-extending arm 26 at its upper end.

A laterally-extending bar 28 is carried by the casting 21 and extends outwardly therefrom, and this arm has secured thereto the forward end of a longitudinally-extending plate 29, secured at its rearward end to the plow-beam, and thus forming a frame to which is pivoted a vertically-extending lever 30, means 31 being provided to hold the lever at different points of its movement. The lever extends above and below its pivot-point and at its lower end is connected by means of a forwardly-extending link 31, to which the member 5 is connected adjacent to one of its ends, and a link 32 extends rearwardly from the lower end of the lever 30 and is connected with the arm 26. It will thus be apparent that the lever 30 may be shifted to move the member 5 with respect to the beam 23, thus varying the lateral angle at which the share enters the ground, and the arrangement of the arm 26 and link 32 is such that the wheel 28 is shifted with the wheels 20 to occupy at all times a plane parallel with those of the last-named wheels.

A colter-wheel 33 is located forwardly of the share 24.

A member 34 extends vertically and is connected with the beam 23 forwardly of the member 5 for sliding vertical movement with respect thereto. A rearwardly-extending lever 35 is pivoted upon a bracket A, carried by the beam, and has a forwardly-extending arm 36, bifurcated at its forward end, and having a vertical roller 37 engaged in its bifurcation, this roller being carried by the upper end of the member 34. Means 38 is provided for holding the lever 35 at different points of its movement, and at its lower end the member 34 has a wheel 39 revolubly connected therewith and disposed to rest upon the ground, the wheel being movable vertically with the member, as will be readily understood, and varies depth of share.

The beam has a clevis 40 at its forward end.

What is claimed is—

1. An implement of the class described, the combination with a beam, of a cross member connected therewith for horizontal pivotal movement, vertical guides carried by the ends of the member, slides in the guides, flexible members connected with the first-named member, rollers pivoted upon the slides, said flexible members being engaged with the rollers, and springs arranged to hold the flexible members yieldably against movement over the rollers.

2. In an implement of the class described, the combination with a cross member, of vertical guides connected with the cross member, slides engaged in the guides, sprockets carried by the upper ends of the slides, chains secured at one end to the guides and engaged over the sprockets, and fixed springs connected with the other ends of the chains to hold the slides yieldably against upward movement.

3. In an implement of the class described, the combination with a beam, of a casting engaged with the beam, a member pivoted to the casting for horizontal movement, wheels carried by the member, a laterally-extending bar carried by the casting, a frame engaged with the bar and secured to the beam, a lever pivoted upon the frame, and connections between the lever and the member for movement of the member upon its pivot when the lever is moved.

4. In an implement of the class described, the combination with a beam, of a casting engaged with the beam, a member pivoted to the casting for horizontal movement, wheels carried by the member, a laterally-extending bar carried by the casting, a frame engaged with the bar and secured to the beam, a lever pivoted upon the frame, a wheel pivotally connected with the beam for lateral movement, a link connected with the wheel and with the pivoted member, said lever being pivoted to the link for movement thereof to shift the wheel and member when the lever is moved.

5. In an implement of the class described, the combination with a beam, of a transverse member pivoted to the beam for horizontal movement, vertical guides carried by the ends of the transverse member, rollers located in the guides, U-shaped slides having their bights directed upwardly engaged in the guides with their legs at opposite sides of the rollers, spindles engaged in the lower ends of the legs, wheels mounted upon the spindles, sprockets carried by the bights of the slides, chains having fixed ends engaged over the sprockets, and springs secured to the member and connected with the chains to hold the latter yieldably with the slides against upward movement.

In testimony whereof I affix my signature in presence of two witnesses.

GEORGE W. BARNETT.

Witnesses:
 JOHN G. CASHEW,
 J. P. BROWN